April 21, 1964 W. G. GITTINS ETAL 3,130,101
MANUFACTURE OF PLASTIC COVERED PANELS
FOR USE IN BUILDING CONSTRUCTION
Filed Aug. 11, 1961 2 Sheets-Sheet 2
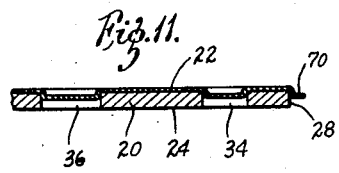
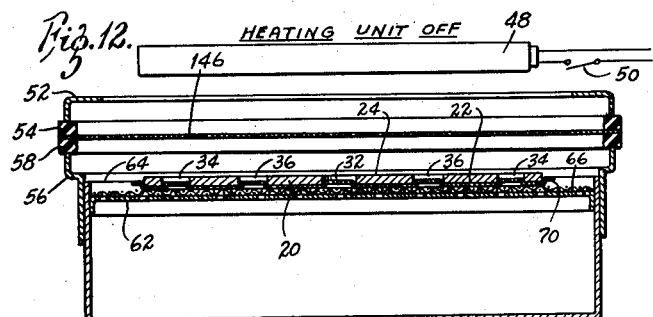
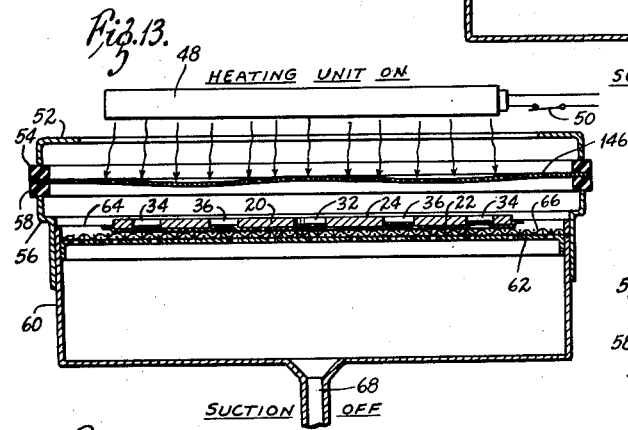
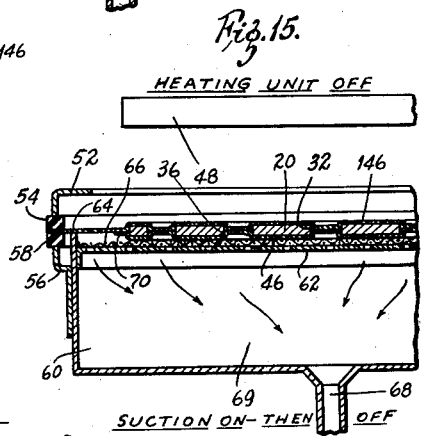
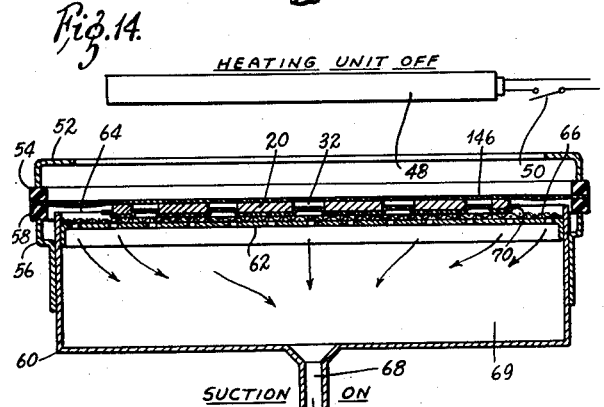
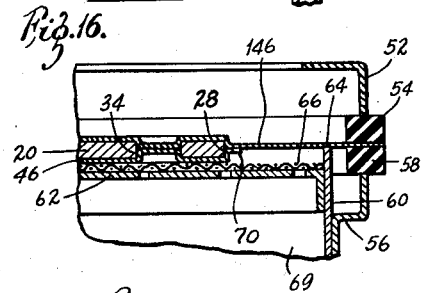
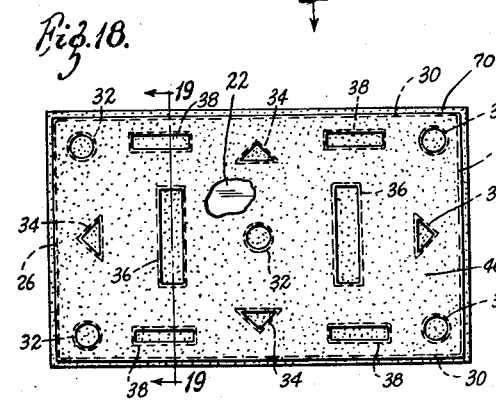
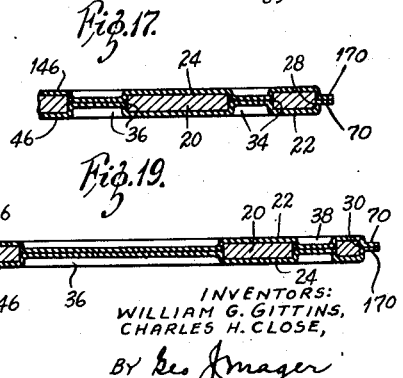
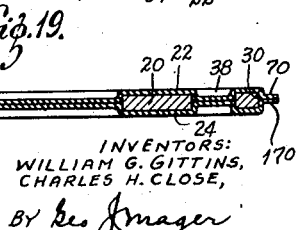
INVENTORS:
WILLIAM G. GITTINS,
CHARLES H. CLOSE,
BY Geo Jmager
THEIR ATTORNEY United States Patent Office 3,130,101
Patented Apr. 21, 1964

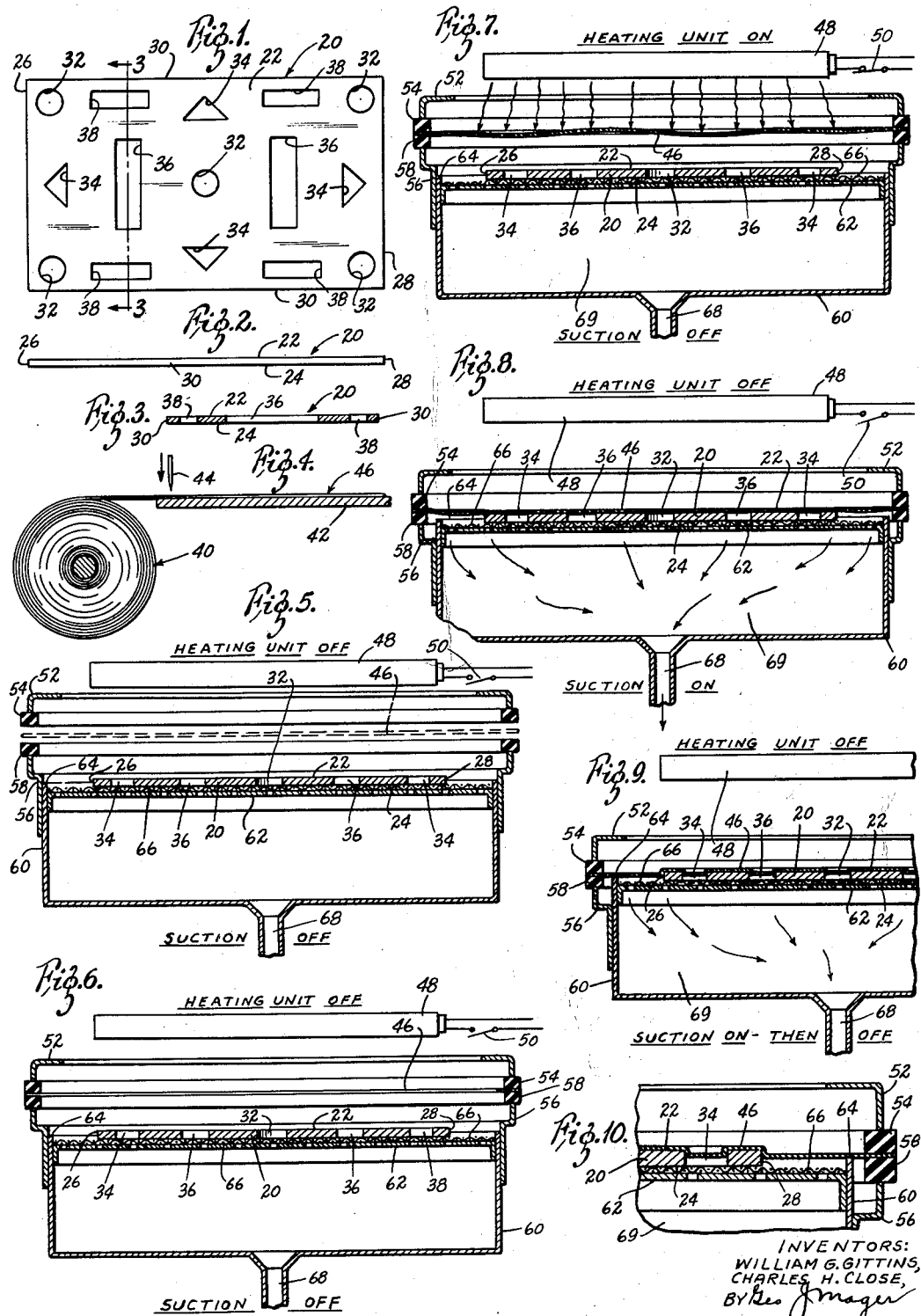

3,130,101
MANUFACTURE OF PLASTIC COVERED PANELS
FOR USE IN BUILDING CONSTRUCTION
William G. Gittins, Ladue, and Charles H. Close, Pacific, Mo. (both of 11033 Manchester Road, St. Louis 22, Mo.)
Filed Aug. 11, 1961, Ser. No. 130,903
6 Claims. (Cl. 156—163)

Generally the present invention relates to the manufacture of building materials, primarily though not exclusively designed for interior purposes.

More particularly, the present invention is directed to the manufacture of wall and ceiling panels, door panels, partition panels and the like, and to a novel method for producing building units of this character that are encased in or covered with plastic material.

The panel bodies proper may be fabricated of any appropriate material. In other words, these may be formed of cardboard, of fibre board, of asbestos board, and so on. The well known Masonite board is ideal, and for relatively sturdy but light weight installations, panel bodies of translucent or opaque plastic, wood, and so on, may be treated in accordance with the teachings of this invention. The materials whereof the main bodies of the ultimate panels contemplated by the present invention are fabricated, many thus be understood to cover a wide range with respect to composition, weight, density, color, and so on.

In accordance with the concepts of this invention however, the said main bodies of the panels would not be solid, but would be perforated to present various ornamental designs whereby their ultimate appearance would be pleasing and attractive to the eye of an observer. The design patterns could optionally be uniform or diversified, so that for example, in an erected partition wall, adjacent panels produced in accordance with the method taught by this invention could have contrasting though blending designs incorporated therein. Furthermore as will appear, ultimate panel units may be produced having a selected color plastic covering one face thereof, and a different color covering the opposite face thereof.

The primary object of the present invention accordingly, is to provide a novel method for manufacturing any of the described plastic covered panels, as well as panels similar to those described. As is well known, thermoplastic sheeting is currently available in the flat, as well as in rolls, and may be obtained from manufacturers in any desired color or color combination, specified widths, and specific thicknesses. Exemplary thermoplastic materials in this category will be recited hereinbelow. Such thermoplastics are manufactured in sheet form and may subsequently be subjected to heat application, and thereupon drawn by vacuum means to encompass a therebelow disposed object or mold, the mold herein contemplated being a male mold suspended by means of a perforated plate. The male mold aforesaid would be comprised of a prefabricated panel body provided with a pattern of perforations that preferably but not necessarily are arranged in design fashion. As a general rule, the thermoplastic sheet material contemplated for use in practicing the present method, would vary in thickness from a minimum of one sixty-fourth of an inch to a maximum of one-tenth of an inch, depending on whether the ultimate product were being produced for interior or exterior construction, and other factors.

The method whereby the invention attains its objectives is more or less diagrammatically illustrated on two sheets of drawings that accompany this specification. In these drawings, the production of a partition panel has been selected for illustrative purposes. It will be understood, however, that the illustrated ultimate panel produced in accordance with the teachings of this invention is exemplary only. That is to say, wall panels, ceiling panels, door panels and so on, may be produced by employing the method of this invention, and furthermore, such panels may be produced in various sizes and thicknesses as desired. It will also be understood that although the drawings illustrate the invention relatively to a single panel, in actual production a plurality of such units would be concurrently processed.

In said drawings:

FIGURE 1 is a top plan view of a rectangular panel body having variously contoured openings or perforations formed therein, these perforations having been chosen to facilitate the illustration of the invention in clear fashion rather than to present an ornamental design.

FIGURE 2 is an edge view of the FIGURE 1 panel body;

FIGURE 3 is a transverse sectional view taken on the line 3—3 of FIGURE 1;

FIGURE 4 is a diagrammatical view partly in section, illustrating a roll of thermoplastic material having a length thereof extended over the upper surface of a stationary supporting plate or the like, in position to be severed from the main body of said roll as schematically suggested;

FIGURES 5, 6, 7, 8, and 9 are vertical sectional views, partly in elevation, schematically illustrating some of the suecessive steps included in the method taught by the present invention for applying a plastic covering to one face of the FIGURE 1 panel body;

FIGURE 10 is a fragmentary sectional view, illustrating the final one of the FIGURES 5 through 9 steps on an enlarged scale;

FIGURE 11 is a fragmentary sectional view on a scale corresponding to that of FIGURE 10, illustrating the condition of the covered panel body in consequence of further steps included in the method taught by the present invention for applying a plastic covering to one face of said body;

FIGURES 12, 13, 14 and 15 are vertical sectional views, partly in elevation, schematically illustrating some of the successive steps included in the present method for applying a plastic covering to the opposite face of the FIGURE 1 panel body;

FIGURE 16 is a fragmentary sectional view illustrating the final one of the FIGURES 12 through 15 steps on an enlarged scale;

FIGURE 17 is a fragmentary sectional view on a scale corresponding to that of FIGURES 11 and 16, illustrating the condition of the covered panel body in consequence of further steps included in the present method;

FIGURE 18 is a top plan view of the ultimate panel; and FIGURE 19 is a transverse sectional view on a scale corresponding to that of FIGURE 17, and taken on the line 19—19 of FIGURE 18.

With attention directed particularly to FIGURES 1 through 3, the exemplary rectangular panel body there shown is designated 20, and exhibits what will for descriptive clarity herein be termed a front or top face 22, a rear or bottom face 24, and (as viewed in the drawings), a left end marginal edge 26, a right end marginal edge 28, and side marginal edges 30.

Simulative of any contemplated design that may be imparted to the panel body 20 by means of perforations formed therein, the openings or perforations that appear will be designated by reference characters, so that in the further description with reference to the drawings, a comprehensive understanding of the present invention may be more readily had.

Thus as best seen in FIGURE 1, the panel body 20 has formed therein exemplarily: a plurality of circular perforations 32; a plurality of triangular perforations 34; a plurality of large rectangular perforations 36; and a plurality of comparatively smaller rectangular perforations 38.

In FIGURE 4, numeral 40 designates a roll of thermoplastic sheet material suitable for use in carrying out the method of the present invention. As noted hereinabove, rolls of such material are commercially available, and may be obtained in widths of pre-specified dimensions, as well as in various colors and combinations of colors. There are numerous thermoplastic materials presently available in sheet form and furnished on rolls, among these being acetal resins, acrylics, cellulosics, nylons and vinyls. Any of these materials in sheet form may be treated in accordance with the method taught by this invention in order to achieve its primary objective.

An unrolled length of thermoplastic sheet material is shown extended over the upper surface of a bed or plate 42, in position to be severed from the main body of the roll. As schematically suggested by the blade 44, sufficient material would be severed from the roll to form the rectangular sheet 46 that is shown by broken lines in FIGURE 5, and sectionally in FIGURES 6 through 11. It will be understood that the dimensions of the sheet 46 are predetermined in accordance with the periphery of the panel body 20, and the schematically illustrated apparatus to be described.

The apparatus employed in performing the most important steps of the present method is schematically illustrated in FIGURES 5 through 10, and in FIGURES 12 through 16. This apparatus includes: an electrical heating unit 48, that may be of the infra-red rod type, and is controlled by an appropriate on-and-off switch 50; an upper clamping frame 52, having a bottom peripheral edge 52 of rubber or similar material; a lower clamping frame 56, having an upper peripheral edge 58 of rubber or similar material; a hollow housing 60; a perforated horizontally disposed plate 62, rigidly mounted in the housing below the open upper end 64 thereof; a screen 66 removably disposed on and supported by the plate 62; and a suction conduit or pipe 68, leading to the housing 60 from a conventional vacuum tank (not shown).

The clamping frames 52 and 56 are adapted to be brought together and then releasably locked in such position after, as will be explained below, a sheet 46 has been properly placed to have its marginal portions engaged by the rubber peripheral edges 54 and 58 of said frames. Suitable mechanism is included in the apparatus for raising and lowering the clamping frames independently or in unison, the lower frame 56 being slidably mounted on the housing 60. The screen 66, though preferably employed, is not absolutely necessary. The vacuum tank referred to would be of the electrically operated type, and would also be controlled by an appropriate on-and-off switch.

It is noted at this point, that the apparatus and the therewith associated mechanisms employed in carrying out the method, form per se no part of the present invention. Automatic material feeding and slitting machines, heating units, adjustable clamping frames and operating mechanism therefor, vacuum operated forming machines and so on, are all commercially available, and may be set up for mass production of panels in accordance with the concepts of this invention. Such a set-up would include timers and other suitable controls, as should be understood.

In practicing the method taught by this invention, a first appropriately dimensioned sheet 46 of thermoplastic material would be severed from the roll 40 as suggested in FIGURE 4. The panel body 20 would be deposited onto the screen 66, being thus supported by the perforated plate 62 along the open upper end 64 of the housing 60, as shown particularly in FIGURE 5. As observed hereinabove, the screen 66 may be dispensed with, particularly when the design perforations in the panel body 20 are closely spaced.

Thereupon, the sheet 46 would be clamped along its marginal portions between the peripheral edges 54 and 58 respectively, of the clamping frames 52 and 56, whereupon said frames would be locked in clamping position. The placement of the sheet 46 is suggested by broken lines in FIGURE 5, and the clamped disposition thereof is shown in full lines in FIGURE 6. The clamping frames aforesaid would be so located, that when brought together and locked, the sheet 46 would be suspended in a horizontal plane at a determined distance below the heating unit 48, and above the panel body 20.

With the sheet 46 thus suspended, the switch 50 would be closed to energize the heating unit 48, whereby to direct hot rays against the therebelow expanse of said sheet, as suggested by the arrows appearing in FIGURE 7. In this connection, it will of course be appreciated that various factors determine the duration of the heat application operation. A most important factor would be the thickness of the sheet 40. Other factors would be the intensity of heat producible by the unit 48 being employed, the temperature at which the particular thermoplastic material being treated will soften, the temperature at which said material will melt, and so on. As the heat rays are diffused over the suspended sheet 46 for the proper length of time as determined by the factors aforesaid, the theretofore rigid body of said sheet softens and becomes elastic, as also suggested in FIGURE 7.

Thereupon, three steps included in the instant method would be effected concurrently. In other words, the heating unit 48 would be deenergized by opening the switch 50, the marginally clamped and now elastic sheet 46 would be lowered onto the panel body 20, and the vacuum mechanism would be energized simultaneously. It is to be noted that as the clamping frames 52 and 56 with the suspended sheet 46 are lowered from the FIGURE 7 to the FIGURE 8 position thereof, the sheet 46 tends to create an effective temporary vacuum chamber 69 within the housing 60. The vacuum chamber 69 is complete when said sheet, in consequence of its descent from the FIGURE 8 to the FIGURE 9 position thereof, overlies the peripheral edge 64 of the theretofore open upper end of said housing.

Momentarily after the clamping frames and the sheet 46 reached the FIGURE 9 position thereof, the suction mechanism would be shut off. In the meantime, the suction will have drawn portions of the sheet into each of the design apertures and permanently bonded other portions of the sheet to the upper surface 22 and the peripheral edges 26, 28, and 30 of the panel body 20, as illustrated.

The upper clamping frame 52 would now be elevated, and thereupon the panel body 20 and the thereto bonded sheet 46 would be removed. Thereafter, the major marginal portions of the sheet that extend beyond the peripheral edges of the panel body 20 would be trimmed off. The resultant condition of the now half-processed panel will be apparent from an inspection of FIGURE 11, where the peripheral marginal edge portion of the sheet remaining after the trimming operation is designated 70.

With the lower clamping frame 56 now elevated to the FIGURE 5 position thereof, and the half-processed panel of FIGURE 11 inverted and deposited onto the screen as shown in FIGURE 13, a second sheet 146 of thermoplastic material would be severed from the roll 40. The sheet 146 would of course be a counterpart of the sheet 46, and would be clamped, suspended, heat treated and so on, precisely in the manner described relatively to said sheet 46.

Inasmuch as these steps have been clearly illustrated in the drawings, it is not believed requisite to elaborate thereon. In other words, the successive steps of the instant method that have been hereinbefore described relatively to FIGURES 6 through 9 with respect to the sheet 46, would be repeated and are visibly demonstrated in FIGURES 13 through 15 with respect to the counterpart sheet 146.

A comparison of FIGURE 16 with FIGURE 10 is invited. FIGURE 16 demonstrates the bonding or heat sealed integration of the marginal portions of the sheet 146 with the peripheral marginal edge 70 of the sheet 46.

Following completion of the method step illustrated in FIGURES 15 and 16, the upper clamping frame 52 would be elevated, and thereupon the panel body 20, with the thereto bonded sheets 46 and 146 would be removed. Thereafter, the major marginal portions of the sheet 146 that remain beyond the peripheral edges of the panel body 20 would be trimmed off, in correspondence with the trimming operation described in connection with the sheet 46. The resultant condition of the thus completely processed panel will be apparent from an inspection of FIGURE 17, where the peripheral marginal edge portion of the sheet 146, that remains after the trimming operation, is designated by the numeral 170.

From the foregoing description and the drawings, it should be apparent that the invention provides a novel method whereby panels of the character under consideration may be produced by employing the same apparatus. With respect to the steps of severing the sheets 46 and 146 from the roll 40, it should be apparent that in actual production, these sheets may be provided in quantities prior to being positioned between the clamping frames. Both of said sheets may be uniform in color, or each may be of a different color. The panel bodies may be fabricated of opaque material, or of translucent material. The perforations producing the designs in the panel bodies may be large or small, closely or widely spaced, and so on.

A top plan view of the exemplary ultimate panel produced in accordance with the method of the present invention is illustrated in FIGURE 18, and in consequence of a comparison of this view with FIGURE 1, it is believed that a comprehensive understanding of the invention should be had. In the interest of clarity, the top sheet 46 has been stippled lightly in FIGURE 18, and a portion of said sheet has been broken away to disclose the therebelow top surface 22 of the panel body 20.

Generally, building panels produced by the present method can be employed in the erection of partitions, walls, ceilings and so on, in the form illustrated. In the event however, that it were desirable with respect to certain installations that closer panel contiguity be had, the marginal edges 70 and 170 could also be trimmed off. It is also contemplated that these edges may be so trimmed and bent as to provide an interlocking arrangement between adjacent panels.

What is claimed is:

1. In the manufacture of plastic covered panels for use in building construction, the panel bodies thereof having been prefabricated and provided with perforations that present an ornamental design, the method which includes the following steps: severing a first sheet of predetermined size from a roll of thermoplastic material; depositing the panel body onto a horizontally disposed perforated plate rigidly mounted near the open upper end of a hollow housing with a wire screen interposed between said panel body and said perforated plate; suspending said first sheet above the panel body in predetermined spaced relationship relatively to a heating unit disposed thereabove, with the marginal portions of the sheet clamped between vertically movable clamping frames; directing heat rays from the heating unit against the suspended sheet for a determined length of time sufficient to soften the sheet and impart elasticity thereto; lowering the thus treated sheet onto the panel body, with the heating unit turned off and suction simultaneously applied from below, the lowered sheet combining with the thus closed upper end of said housing to form a vacuum chamber about and below the panel body; further lowering the sheet until the clamped marginal portions thereof reaches a plane approximately co-planar with the upper end of the housing, the suction being constantly applied whereby to draw the sheet material into the perforations of the panel body, against the top surface thereof, and against the upper half of the peripheral edges of the panel body; shutting off the suction; elevating the upper clamping frame; removing the thus processed panel body and trimming therefrom the major marginal portions of the sheet that extend beyond the peripheral edges of said panel body; inverting the thus half-processed panel body and depositing same onto the perforated plate aforesaid with the lower clamping frame in elevated position; severing a second sheet corresponding in size with the first sheet from a roll of thermoplastic material; suspending said second sheet above the panel body in predetermined spaced relationship relatively to said heating unit disposed thereabove, with the marginal portions of the sheet clamped between said vertically movable clamping frames; directing heat rays from the heating unit against the suspended sheet for a determined length of time sufficient to soften the sheet and impart elasticity thereto; lowering the thus treated sheet onto the panel body, with the heating unit turned off and suction simultaneously applied from below, the lowered sheet combining with the thus closed upper end of said housing to form a vacuum chamber about and below the panel body; further lowering the sheet until the clamped marginal portions thereof reaches a plane approximately co-planar with the upper end of the housing, the suction being constantly applied whereby to draw the sheet material into the perforations of the panel body, against the top surface thereof, and against the upper half of the peripheral edges of the panel body; shutting off the suction; elevating the upper clamping frame; removing the thus processed panel body and trimming therefrom the major marginal portions of the sheet that extend beyond the peripheral edges of said panel body.

2. In the manufacture of plastic covered panels for use in building construction, the panel bodies thereof having been prefabricated and provided with perforations that present an ornamental design, the method which includes the following steps: severing a first sheet of predetermined size from a roll of thermoplastic material; depositing the panel body onto a horizontally disposed perforated plate rigidly mounted near the open upper end of a hollow housing; suspending said first sheet above the panel body in predetermined spaced relationship relatively to a heating unit disposed thereabove, with the marginal portions of the sheet clamped between vertically movable clamping frames; directing heat rays from the heating unit against the suspended sheet for a determined length of time sufficient to soften the sheet and impart elasticity thereto; lowering the thus treated sheet onto the panel body, with the heating unit turned off and suction simultaneously applied from below, the lowered sheet combining with the thus closed upper end of said housing to form a vacuum chamber about and below the panel body; further lowering the sheet until the clamped marginal portions thereof reaches a plane approximately co-planar with the upper end of the housing, the suction being constantly applied whereby to draw the sheet material into the perforations of the panel body, against the top surface thereof, and against the upper half of the peripheral edges of the panel body; shutting off the suction; elevating the upper clamping frame; removing the thus processed panel body and trimming therefrom the major marginal portions of the sheet that extend beyond the peripheral edges of said panel body; inverting the thus half-processed panel body and depositing same onto the perforate plate aforesaid with the lower clamping frame in elevated position; severing a second sheet corresponding in size with the first sheet from a roll of thermoplastic material; suspending said second sheet above the panel body in predetermined spaced relationship relatively to said heating unit disposed thereabove, with the marginal portions of the sheet clamped between said vertically movable clamping frames; directing heat rays from the heating unit against the suspended sheet for a determined length of time sufficient to soften the sheet and impart elasticity thereto; lowering the thus treated sheet onto the panel body, with the heating unit turned off and suction simultaneously applied from below, the lowered sheet combining with the thus closed upper end of said housing to form a vacuum chamber about and below the panel body; further lowering the sheet until the clamped marginal portions thereof reaches a plane approximately co-planar with the upper end of the housing, the suction being constantly applied whereby to draw the sheet material into the perforations of the panel body, against the top surface thereof, and against the upper half of the peripheral edges of the panel body; shutting off the suction; elevating the upper clamping frame; removing the thus processed panel body and trimming therefrom the major marginal portions of the sheet that extend beyond the peripheral edges of said panel body.

3. The method recited in claim 1 wherein the first severed sheet and the second severed sheet of thermoplastic material are uniform in color.

4. The method recited in claim 1 wherein the first severed sheet and the second severed sheet of thermoplastic material are different in color.

5. The method recited in claim 1 wherein the panel body is fabricated of opaque material.

6. The method recited in claim 1 wherein the panel body is fabricated of translucent material.

References Cited in the file of this patent
UNITED STATES PATENTS

| | | |
|---|---|---|
| 2,805,181 | Groff et al. | Sept. 3, 1957 |
| 3,024,579 | Stockhausen et al. | Mar. 13, 1962 |
| 3,072,520 | Groth | Jan. 8, 1963 |
| 3,084,085 | Ronay | Apr. 2, 1963 |